United States Patent [19]

Chou et al.

[11] Patent Number: 5,341,795
[45] Date of Patent: Aug. 30, 1994

[54] INDUCER FOR CONDENSING FURNACE

[75] Inventors: Rudy S. Chou, Liverpool, N.Y.;
Michael J. Larsen, Danville, Ind.;
Rengasamy Ramshankar, Liverpool,
N.Y.; Larry D. Rieke, Zionsville;
Timothy J. Waterman, Carmel, both
of Ind.

[73] Assignee: Carrier Corporation, Syracuse, N.Y.

[21] Appl. No.: 83,574

[22] Filed: Jun. 30, 1993

[51] Int. Cl.5 .................. F24H 3/02; F01B 31/18
[52] U.S. Cl. .................. 126/110 R; 126/99 R;
126/112; 126/80; 415/169.2; 415/169.4
[58] Field of Search ............ 126/110 R, 99 R, 110 A,
126/104 A, 112, 77, 299 R, 299 D, 299 F;
454/241; 415/169.2, 169.3, 169.4, 108, 126, 3.1, 2.1

[56] References Cited

U.S. PATENT DOCUMENTS

| 2,330,938 | 10/1943 | Williams . | |
|---|---|---|---|
| 2,341,871 | 2/1944 | Karrer . | |
| 3,274,757 | 9/1966 | Wapler | 415/169.2 X |
| 3,467,302 | 9/1969 | Wilson . | |
| 3,915,596 | 10/1975 | Frazar | 415/169.2 X |
| 4,476,773 | 10/1984 | Fehr . | |
| 4,603,680 | 8/1986 | Dempsey et al. | 126/99 R X |
| 4,649,653 | 3/1987 | Ameling | 415/169.2 X |
| 4,682,579 | 7/1987 | Bigham | 126/99 R X |
| 4,798,516 | 1/1989 | Jagst et al. | 415/169.2 X |
| 4,856,550 | 8/1989 | Smelcer | 126/99 R X |
| 4,899,726 | 2/1990 | Waterman | 126/99 R X |
| 5,046,478 | 9/1991 | Clawson | 126/110 R |

FOREIGN PATENT DOCUMENTS 602689 4/1978 U.S.S.R. ............ 415/162.2

Primary Examiner—Larry Jones

[57] ABSTRACT

An inducer (40) for causing a flow of combustion air into and gases of combustion through and out of a furnace (10) of the condensing type. The inducer is intended for use, without modification of its design or size, in a series of furnaces of the same basic design but having different heating capacities and therefore different requirements for flow through the induction flow path. The furnace design is such that a given furnace is capable of operation so as to provide a flow of air to be heated that is either up, down or horizontal with only minor field modification on installation. The inducer has two discharges (43), only one of which is used in a given installation. The other discharge is blocked with a plug (61) of special configuration that can vary the output of the inducer to ensure optimum flow of combustion air into and gases of combustion through and out of the furnace. The inducer configuration is such that, in every possible orientation of the furnace installation, at least one of its two drains (47) is at the low point of the inducer housing (41) so that all condensate that collects in the housing can flow to a lowpoint drain regardless of the orientation of the furnace.

8 Claims, 6 Drawing Sheets

INDUCER FOR CONDENSING FURNACE

BACKGROUND OF THE INVENTION

This invention relates generally to appliances for heating air. More particularly, the invention relates to an inducer for drawing combustion gases through the heat exchangers of a condensing hot air furnace.

Hot air furnaces are widely used to heat enclosed spaces such as residential and commercial buildings. In such a furnace, a fuel is burned in the presence of air to produce hot gases of combustion. Where the fuel is a fuel gas, the gas is mixed with air to form a combustible mixture which is then burned to produce the gases of combustion. These gases pass through a primary heat exchanger in the furnace before passing through a flue to the atmosphere. Air from the space to be heated, from a source external to the space(s) to be heated or a mixture of air from both also passes through the primary heat exchanger, via a flow path that is separate from but in heat exchange relationship with the flow path of the hot combustion gases. The heated air then passes out of the furnace to be conducted to the space or spaces to be heated via appropriate means such as ducting.

Where the fuel is a gas, there is an optimum proportion of fuel to air in the combustible gas mixture that will not only result in the most efficient combustion of the fuel but also minimize the production of undesirable combustion products such as carbon monoxide and various oxides of nitrogen.

One combustion product of the fuels typically used in hot air furnaces is water. In many prior art furnaces, the gases of combustion pass directly from the primary heat exchanger to the flue. The water vapor in the gases of combustion thus passes out of the furnace and the heat contained in the water vapor is lost. In order to increase efficiency, many hot air furnaces now include heat exchangers for condensing the water and thus recover heat that would otherwise be lost.

Many furnaces depend on natural convection to supply draft to move gases of combustion from the burner or burners through the primary heat exchanger and out the flue. However, natural draft may not be capable of providing sufficient flow through the condensing heat exchanger if one is installed. In addition, improved heat transfer performance can be achieved if the flow of air to be heated is counter to the flow of gases of combustion. This counter flow cannot exist in a furnace in which there is both natural draft and an upflow of the air to be heated. And still further, space and other considerations may require that a particular furnace not be of the updraft type that can use natural draft. In these situations, some type of forced, usually induced, draft is employed to cause flow through the flow path for gases of combustion. In an induced draft furnace, an inducer takes a suction on the condensing heat exchanger, and thus on the primary heat exchanger, and discharges to the flue. The condensing heat exchanger may not be completely effective at condensing all the water vapor in the gases of combustion that flow through it. Therefore, some water vapor may pass through the inducer and into the flue. Some of this vapor may condense in the inducer housing or in the flue. Since the inducer is generally located below the flue, any water that condenses in the flue will drain back into the inducer housing. To prevent the inducer housing from becoming flooded with water, some means must be provided for draining collected water from the housing.

If space and other considerations, including ducting and flue arrangements, permit, the typical furnace installation usually includes an upflow furnace, in which the air to be heated flows upward through the furnace. But such considerations may dictate that a particular furnace installation be of some other type, such as downflow or even have an air flow that is horizontal. Downflow arrangements are typically seen in heating systems for individual units in residential apartment buildings. Furnaces installed in the crawl spaces beneath houses typically have horizontal air flow.

Manufacturers have usually met the demand for furnaces capable of installation in a variety of orientations by designing and building furnaces having configurations specialized to each orientation. This practice results in the necessity to have a variety of different furnace model series with a resultant increase in the amount of inventory required at all levels in the chain of supply.

For simplicity in design and manufacture, it is common to make a given fundamental furnace design in several different heating capacity ranges. This is usually done by varying the number of burners and the associated heat exchanger cells. An increase in the number of burners requires an increase in the rate of flow combustion air into the furnace and in combustion gases through and out of the furnace. The rate of gas flow through an induced draft furnace is a function of the characteristics of the inducer and the pressure losses in the flow path of combustion air and gases of combustion both in the furnace itself and in the flue that serves the furnace. In order to simplify manufacturing and inventory management, it would be desirable to be able to use the same inducer in all furnaces of the same fundamental design, regardless of the orientation in which a given furnace may be installed and regardless of the heating capacity of that furnace.

What is needed is a hot air furnace of a single design that can be installed and operated in a variety of orientations, i.e. in either an upflow, a downflow or a horizontal flow configuration. And, to meet this requirement, the furnace must have an induction system that is capable of operating regardless of the orientation of the furnace in a given installation. The draft of the inducer should be variable so that the proper mix of air and fuel as well as the proper flow of gases of combustion can be achieved in all furnaces, regardless of heating capacity, in the model series.

SUMMARY OF THE INVENTION

The present invention fills the needs for an inducer discussed above. With only minor modifications that are easily accomplished on-site at the time of installation, it is capable of operating regardless of whether the furnace is oriented for up, down or horizontal air flow. An arrangement of multiple drain connections provide for the ability to drain any condensate water that collects in the inducer housing in whatever orientation a given furnace is installed. And there is the capability to tune the draft flow rate to the optimum value so that the same inducer can be used in furnaces of varying heating capacities.

The inducer housing has two oppositely situated fan discharges, only one of which is used in a particular installation. The choice of which discharge to use is based on the orientation of the furnace as well as other considerations. A special tuner plug blocks off the discharge that is not used in a particular installation.

The inducer housing also has two oppositely situated drain cavities that collect any condensate that may form in the housing or that may drain back into the housing from the flue. Associated with each cavity is a drain outlet. The drain outlets are situated so that one is at the low point of the inducer housing regardless of the orientation, i.e. up, down or horizontal air flow, of the furnace. During installation, a drain tube is connected to the lowermost drain outlet to conduct condensate out of the furnace enclosure to a suitable condensate receiver.

The plug that blocks off the idle discharge has a projection that extends into the interior of the housing. The projection has an arcuate face that conforms to the curvature of the scroll surrounding the inducer fan impeller. The plug can be positioned by rotation within the discharge opening so that the arcuate face is in alignment with the surface of the scroll. In this configuration, the inducer can produce its maximum flow rate. If the plug is rotated so that the arcuate face is not in alignment, the inducer output is reduced. The inducer is sized so that it is capable of causing a sufficient flow in the largest heating capacity furnace in the model series. When a furnace is installed in a particular application, the installer rotates the plug to attain the optimum rate of combustion gas flow through the furnace and fixes the plug in that position.

BRIEF DESCRIPTION OF THE DRAWINGS

The accompanying drawings form a part of the specification. Throughout the drawings, like reference numbers identify like elements.

DESCRIPTION OF THE PREFERRED EMBODIMENT

Figure 1:
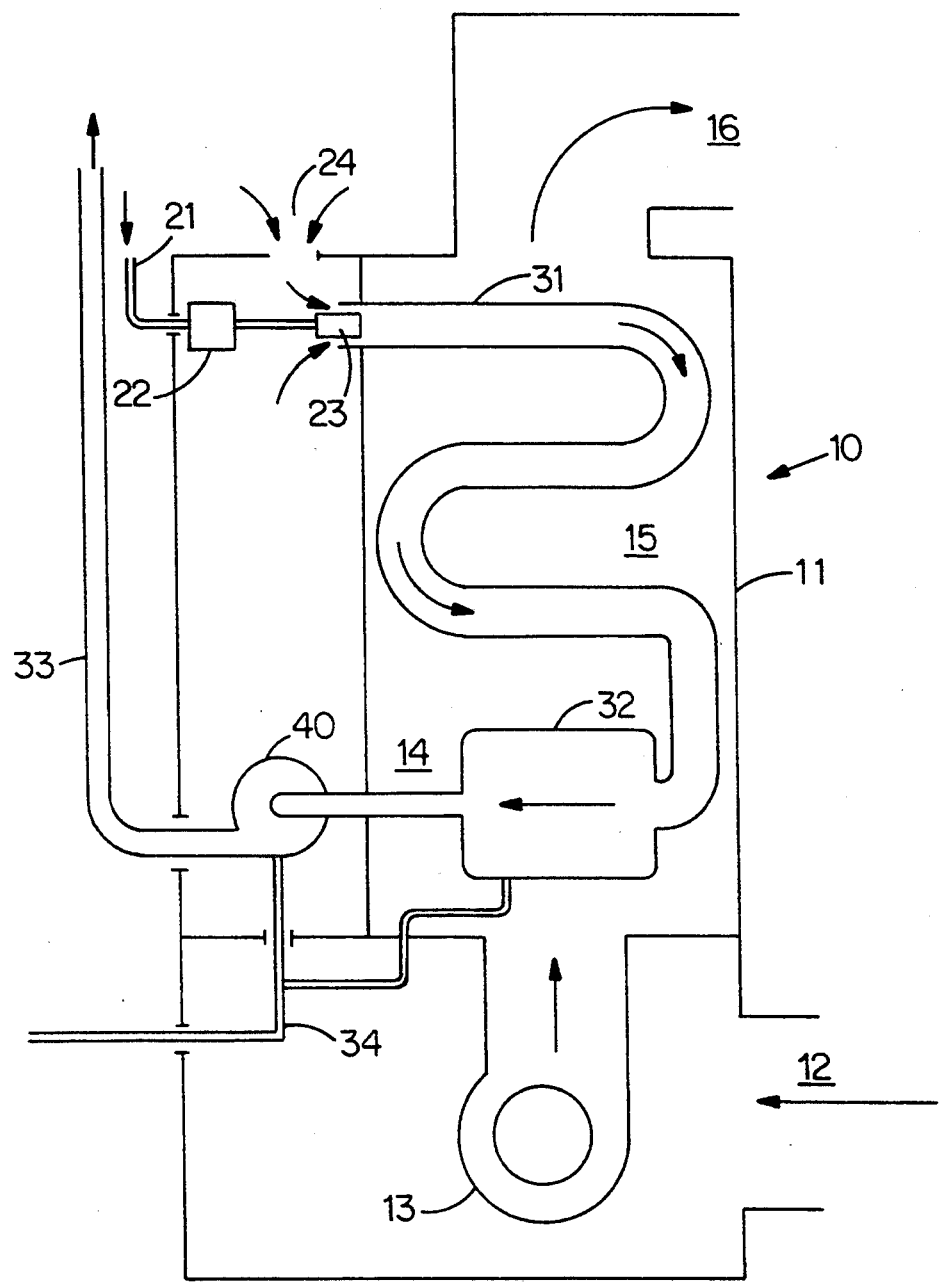
FIG. 1 is a schematic diagram showing the various components of a condensing hot air furnace.

FIG. 1 illustrates the major components of a gas fired condensing furnace having induced draft. The figure shows furnace 10. The furnace has enclosure 11 within which are located the components and the flow paths for air to be heated and for gases of combustion. Air to be heated enters enclosure 11 through cool air inlet 12, passes through main air blower 13, through condensing heat exchanger 14, through primary heat exchanger 15 and then exits enclosure 11 through heated air outlet 16. Fuel gas is supplied to furnace 10 through gas supply line 21. Regulating valve 22 controls the supply of gas to burner 23. Air for combustion enters enclosure 11 through combustion air inlet 24 and mixes with fuel gas at burner 23 to form a combustible mixture which then is burned to produce heat and hot gases of combustion. These gases of combustion flow through primary heat exchanger cell 31, through condensing heat exchanger cell 32 and through inducer 40 before exiting enclosure 11 through flue pipe 33. Heat is transferred from the gases of combustion to air to be heated through the walls of primary heat exchanger cell 31 and condensing heat exchanger cell 32. Drain line 34 conducts water that condenses and collects in condensing heat exchanger cell 32 and inducer 40 out of enclosure 11 to a suitable condensate receiver. Only one burner is shown, but in a typical furnace there are several burners, each burner having its own primary and condensing heat exchanger cells. The heat exchanger cells are arranged side by side with spaces between them to allow for the flow of air to be heated through the primary and condensing heat exchanger sections. In the furnace associated with the inducer of the present invention, there are two or more burners, depending on the heating capacity of a particular model, but only one inducer.

Figure 2:
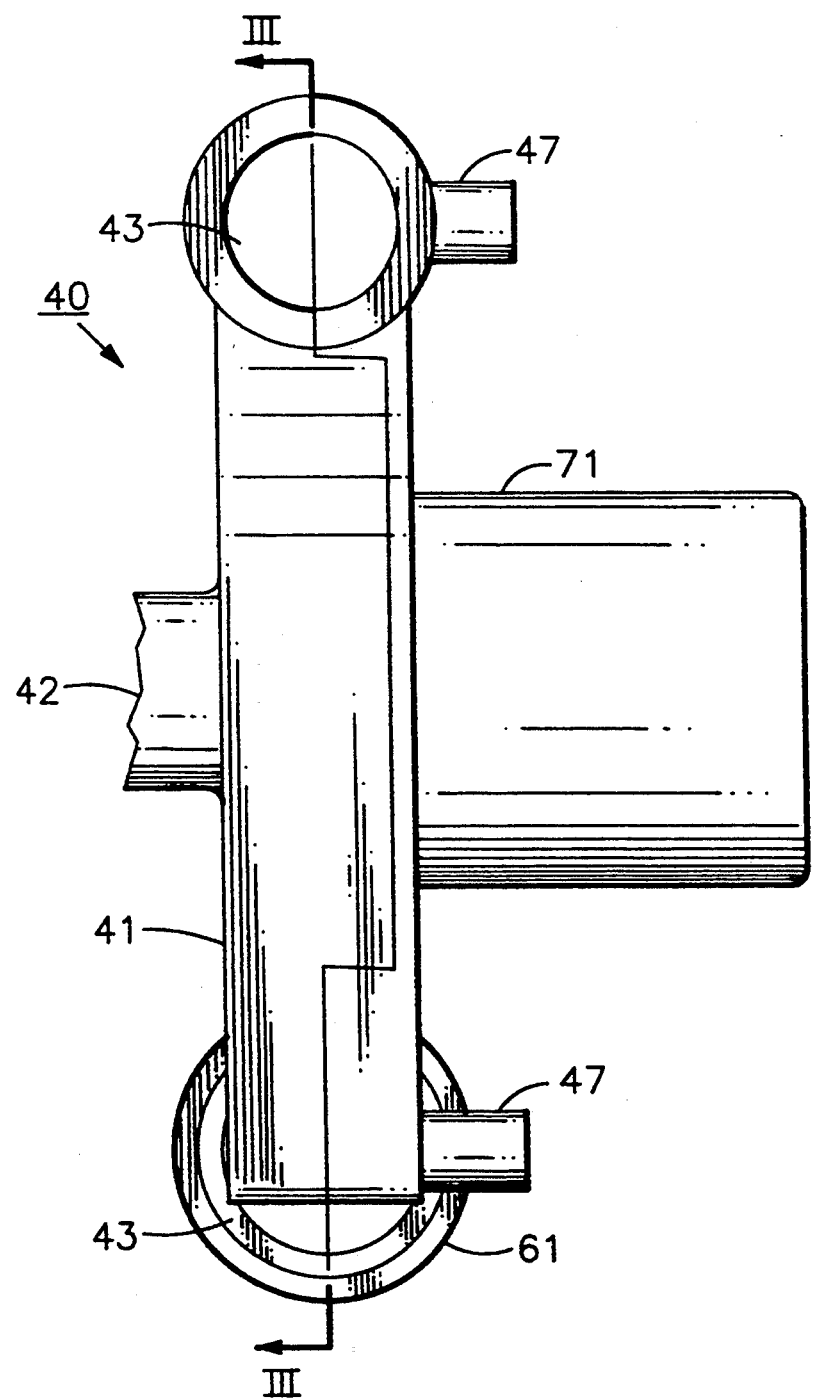
FIG. 2 is a side elevation view of the inducer of the present invention.
Figure 3:
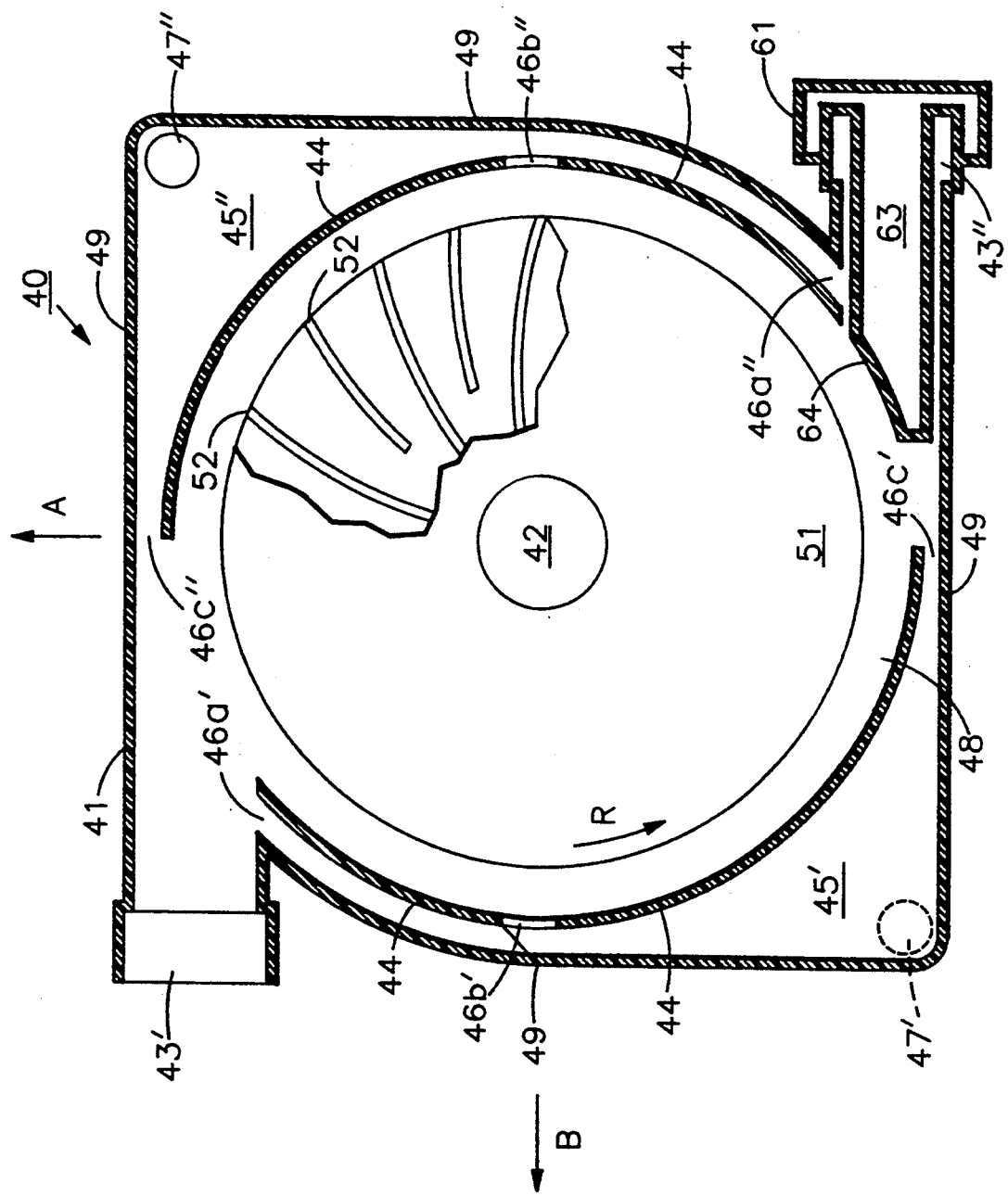
FIG. 3 is a front elevation view, sectioned through line III—III in FIG. 2, of the inducer of the present invention.
Figure 4:
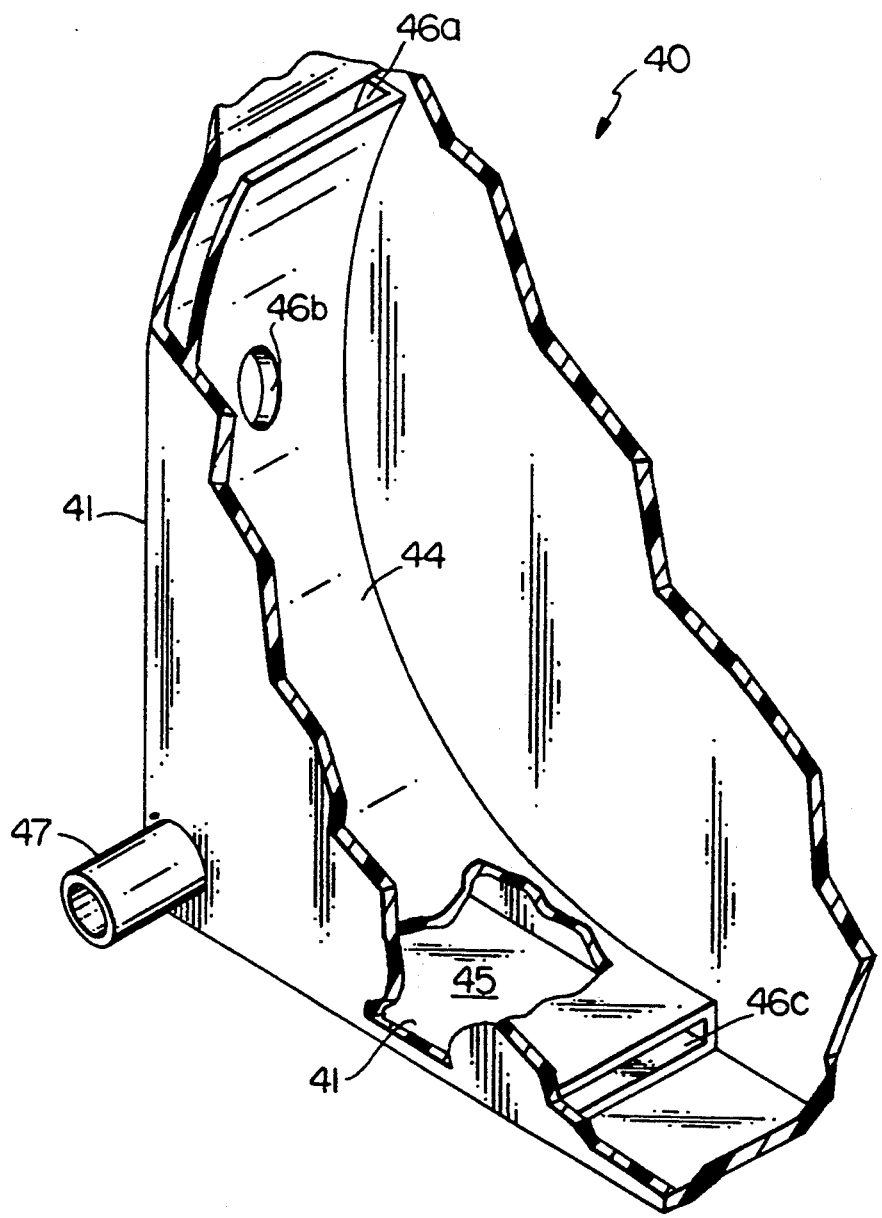
FIG. 4 is a perspective view of a portion of the housing of the inducer of the present invention.

FIGS. 2 through 4 depict various views of the inducer of the present invention. FIG. 2 shows a side elevation view of the inducer of the present invention. FIG. 3 shows a sectioned, through line III—III in FIG. 2, front elevation view of the inducer of the present invention. FIG. 4 shows a perspective, partially broken away, view of a portion of the housing of the inducer of the present invention. Note that the inducer is symmetrical. Note also that certain features shown in FIGS. 3 and 4 are designated by reference numbers that have a prime ('), double prime ("), alphabetic (a, b or c) suffix or both an alphabetic suffix and a prime or double prime suffix. In the description that follows, a reference to a feature by a reference number without suffix means any of the features having the same reference number. Use of suffixes will differentiate between features having the same number where necessary.

In FIG. 2, one can see inducer 40. The inducer has housing 41, suction inlet 42, discharge outlets 43, condensate drain outlets 47 and fan motor 71. FIG. 3 is another view of inducer 40 showing features of its internal construction. Inducer 40 is a fan of the centrifugal flow type and comprises shrouded impeller 51 contained within housing 41. Impeller 51 has backwardly, with respect to direction of rotation R, swept blades 52. Circular inner scroll wall 44 defines volute 48 and directs air emerging from impeller 51 to discharge outlet 43'. Plug 61 blocks discharge outlet 43". The selection of which discharge outlet to block is described below.

Between inner scroll wall 48 and exterior wall 49 of housing 41 is cavity 45. Condensate water that finds its way into housing 41 will enter cavity 45 by way of inlets 46 and then drain from the cavity through drain outlet 47. As will be described below and best illustrated in FIG. 4, water may enter cavity 45 through any of inlets 46a, 46b or 46c.

Figure 5A:
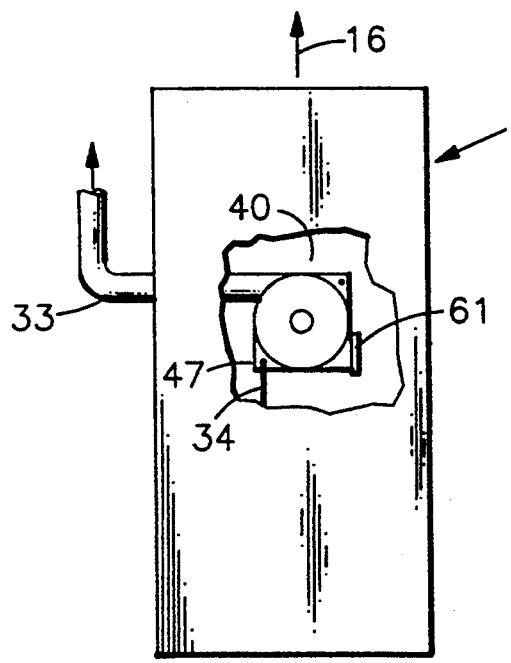
FIGS. 5A, 5B, 5C and 5D show a furnace, having the inducer of the present invention, in the various possible orientations in which it may be installed and operated.
Figure 5B:
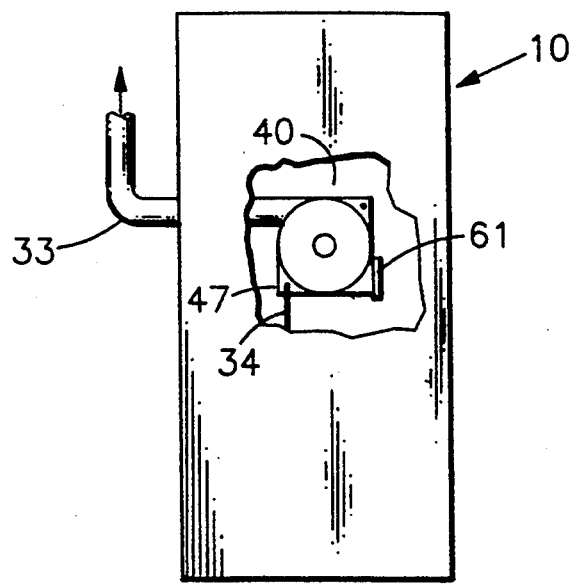
Figure 5C:
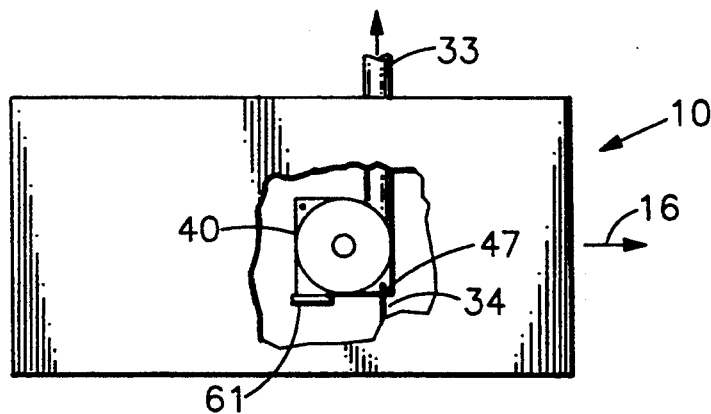
Figure 5D:
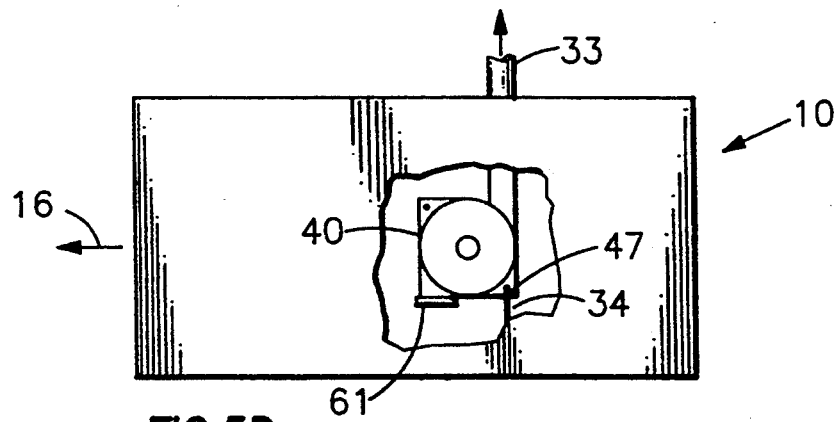

FIGS. 5A, 5B, 5C and 5D show furnace 10 installed to operate with up, down, horizontal right and horizontal left discharge air flows respectively. The figures show how inducer 40 is configured so that, in any installation orientation, one of condensate drain outlets 47 is at the low point of housing 41 (FIG. 3) of inducer 40 so that condensate water will drain from the housing into drain line 34. In addition, in both up and down air flow installations, inducer 40 may be set up to discharge into a flue pipe 33 that extends out of either the left (as shown in FIGS. 5A and 5B) or right side of the furnace, with plug 61 being inserted into the discharge outlet not connected to the flue. In installations where it is desired that the discharge air flow be horizontal, either left or right, the installer connects the upper discharge outlet of inducer 40 to the flue and closes off the lower outlet with plug 61. Note that in all of the four possible orientations in which furnace 10 may be installed and operated, the axis of rotation of impeller 52 is horizontal.

Again referring to FIG. 3 and orienting the figure so that arrow A points up, the figure shows inducer 40 as it would be when furnace 10 is installed for either an up or a down flow of air. With the figure having that orientation, inducer 40 is shown in a configuration for discharging to the left but could also be configured for right discharge. If configured for right discharge plug 61 would block outlet 43' and the flue pipe would connect to discharge outlet 43". In the left discharge configuration, most water vapor that condenses in the flue pipe would drain back through discharge outlet 43' and then enter cavity 45' through inlet 41a'. Any other condensate water that enters or forms in inner scroll wall 48 would enter cavity 45' through inlet 41c'. In the right discharge configuration, water draining back from the flue pipe would enter housing 40 through discharge outlet 43" and then enter cavity 45' through inlet 41c'. Water that collects in cavity 45' drains out of housing 41 through drain 47'.

With FIG. 3 oriented so that arrow B points up, the figure shows inducer 40 as it would be oriented and configured for horizontal left discharge. In this orientation, most condensate draining back into inducer 40 from the flue pipe would enter cavity 45" through inlet 46b". Other condensate that enters or forms in inner scroll wall 44 would enter cavity 45" through inlet 46c". Water that collects in cavity 45" drains out of housing 41 through drain 47".

Note in FIG. 4 that housing 41 is functionally symmetrical, with most corresponding features within the housing, e.g,. discharge outlets 43' and 43" and drain cavities 45' and 45", being located diametrically opposite each other.

Figure 6:
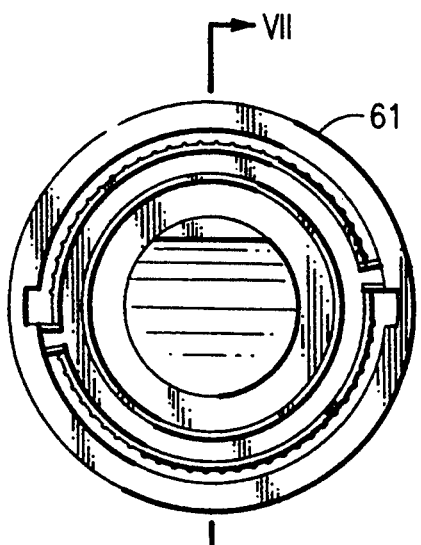
FIG. 6 is an end elevation view of the tuner plug of the present invention.
Figure 7:
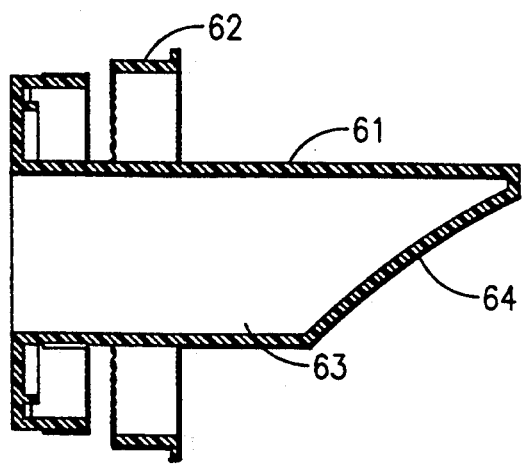
FIG. 7 is a side elevation view, sectioned through line VII—VII in FIG. 6, of the tuner plug of the present invention.
Figure 8:
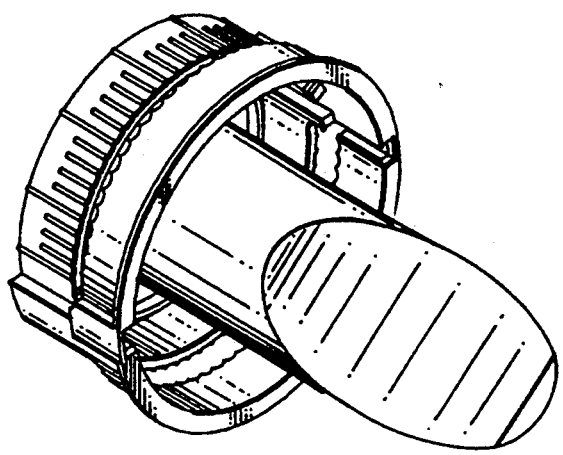
FIG. 8 is a perspective view of the tuner plug of the present invention.

FIGS. 6, 7 and 8 are various views of tuner plug 61. FIG. 7 is a longitudinal cross section taken through line VII—VII in FIG. 6 and FIG. 8 is a perspective view. Plug 61 has closure cap 62 that prevents air leakage when plug 61 is inserted into a discharge outlet 43 (FIG. 2). Projection 63 is generally cylindrical but has arcuate face 64. The radius of curvature of face 64 is the same as the radius of inner scroll wall 44. When plug 61 is inserted into a discharge outlet, it can be rotated so that arcuate face 64 is or is not lined up to provide a generally smooth continuation of the contour of inner scroll wall 48 over the area filled by plug 61. For a given set of external conditions, air flow through inducer 40 will be greatest when the air flow inside housing 41 is disrupted least, i.e. when arcuate face 64 is positioned to line up with the contour of inner scroll wall 44.

Tuner plug 61 is not capable, by itself, of varying the discharge air flow of inducer 40 over the entire range of flows required from the smallest to the largest heating capacity furnaces in a given model series. But it is not necessary that the plug have that capability. A smaller capacity furnace requires a smaller diameter flue pipe. This smaller pipe presents a greater resistance to air flow than would a larger pipe. Over the range of differently rated furnaces, successively higher capacity furnaces have successively larger flue pipes and, with the same inducer installed in all furnaces in the range, the flow rate through the inducer will increase as larger flue pipes are fitted. It is therefore necessary only that the tuner plug be capable of fine tuning the air flow to achieve the optimum rate considering the resistance to flow of the size flue pipe fitted to the furnace.

A field technician can quickly and easily install and set up a furnace containing the inducer of the present invention. The particular application and physical configuration of the environment in which the furnace will operate dictate the orientation of the installation. One part of the task of installation, of course, is to set up a flow path for the gases of combustion to the flue. The heating capacity of the furnace dictates the size of the flue piping that will be used. After setting the furnace in place, the technician connects the appropriate inducer discharge to the flue pipe, installs the tuner plug in the other inducer discharge and connects the condensate drain tubing to the appropriate drain outlet. The installer then completes this portion of the work by starting up the inducer and, with the aid of a measurement device such as a manometer, adjusts the flow through the induction system to the proper value by turning the tuner plug and then fixing it in place. Assuming that conditions remain unchanged, no further action should be necessary for the life of the furnace.

We claim:

1. An inducer (40) for an induced draft condensing hot air furnace (10) capable of operation when installed in more than one orientation comprising:

an inducer housing (41);

a volute (48), formed by an inner scroll wall (44), located within said inducer housing;

a centrifugal impeller (51) within said volute, said impeller having a horizontal axis of rotation when said inducer is in normal operation;

a first and a second discharge outlet (43), in fluid flow communication with said volute through openings in said inner scroll wall, said outlets being arranged with respect to each other such that fluid discharges from said first outlet in a direction that is in the same plane but 180° from the direction that fluid discharges from said second outlet;

a first and a second drain cavity (45) within said housing, each said cavity having an inlet (46) that is in fluid flow communication with said volute; and a drain outlet (47) for conducting fluid from said cavity out of said housing; and a tuner plug (61) capable of installation in one of said discharge outlets so that, upon installation, said discharge outlet is blocked and fluid flow is possible only through the other, or active, said discharge outlet.

2. The inducer of claim 1 in which said opening in said inner scroll wall through which said first discharge outlet is in fluid flow communication with said volute is diametrically opposite said opening in said inner scroll wall through which said second discharge outlet is in fluid flow communication with said volute.

3. The inducer of claim 1 in which:

when said inducer is installed in a first operating orientation, the direction of fluid flowing from said active discharge outlet is horizontal;

when said inducer is installed in a second operating orientation, the direction of fluid flowing from said active discharge outlet is vertical; and in both said orientations, at least one of said drain outlets is positioned so as to drain fluid from the lowpoint of said housing.

4. The inducer of claim 1 in which said inner scroll wall is generally circular in a plane perpendicular to said axis of rotation of said impeller.

5. The inducer of claim 1 in which said impeller has blades (52) that sweep backward with respect to the direction of rotation of said impeller.

6. The inducer of claim 1 in which there are at least three of said inlets into each of said cavities.

7. The inducer of claim 1 in which said discharge outlets are generally circular in cross section and said tuner plug comprises:

a closure cap ( 62 );

a generally cylindrical projection (63) from said closure cap; and an arcuate face (64) formed into said cylindrical projection.

8. The inducer of claim 7 in which said arcuate face has a radius of curvature that is generally the same as the radius of curvature of said inner scroll wall.

* * * * *